(12) United States Patent
Kish et al.

(10) Patent No.: US 7,587,875 B2
(45) Date of Patent: Sep. 15, 2009

(54) FIRE RESISTANCE RATING SYSTEM

(75) Inventors: William Kish, Wadsworth, OH (US); Kenneth Rusk, Toledo, OH (US)

(73) Assignee: No-Burn Investments, L.L.C., Wadsworth, OH (US)

( * ) Notice: Subject to any disclaimer, the term of this patent is extended or adjusted under 35 U.S.C. 154(b) by 820 days.

(21) Appl. No.: 11/044,624

(22) Filed: Jan. 27, 2005

(65) Prior Publication Data

US 2005/0138888 A1   Jun. 30, 2005

Related U.S. Application Data

(63) Continuation-in-part of application No. 10/957,775, filed on Oct. 4, 2004, now abandoned.

(60) Provisional application No. 60/646,245, filed on Jan. 24, 2005.

(51) Int. Cl.
*E04B 1/00* (2006.01)
(52) U.S. Cl. .................. 52/745.05; 52/232; 52/745.01
(58) Field of Classification Search ............. 52/745.01, 52/1, 232, 745.05; 428/213, 522
See application file for complete search history.

(56) References Cited

U.S. PATENT DOCUMENTS

| | | | |
|---|---|---|---|
| 3,196,108 A | 7/1965 | Nelson | 252/2 |
| 3,257,316 A | 6/1966 | Langguth et al. | 252/2 |
| 3,309,324 A | 3/1967 | Langguth et al. | 252/387 |
| 3,513,114 A | 5/1970 | Vandersall et. al. | 523/179 |
| 3,634,234 A | 1/1972 | Morgenthaler | 252/7 |
| 3,730,890 A | 5/1973 | Nelson | 252/7 |
| 3,864,201 A * | 2/1975 | Susuki et al. | 428/106 |
| 3,934,066 A | 1/1976 | Murch | 428/248 |
| 3,955,987 A | 5/1976 | Schaar et al. | 106/15 FP |
| 3,960,735 A | 6/1976 | Lacey | 252/2 |
| 3,969,291 A | 7/1976 | Fukuba et al. | 523/179 |
| 4,028,333 A | 6/1977 | Lindvay | 260/45.8 NT |
| 4,137,849 A | 2/1979 | Hontgas et al. | 102/56 R |
| 4,166,840 A | 9/1979 | Chapman | 423/313 |
| 4,201,593 A | 5/1980 | Sienkowski et al. | 106/18.14 |
| 4,201,677 A | 5/1980 | Shukla et al. | 252/8.1 |
| 4,205,022 A | 5/1980 | Nicholson et al. | 260/953 |

(Continued)

OTHER PUBLICATIONS

Mabey, U.S. Appl. No. 10/132,958, filed Apr. 26, 2002 A.D.

(Continued)

*Primary Examiner*—Basil Katcheves
(74) *Attorney, Agent, or Firm*—Christopher John Rudy (57) ABSTRACT

Fire resistance can be rated for building structure by providing or having made available, and applying or noting application or presence of fire control agent(s) to or with component part(s) of the structure; providing a fire resistance rating format of a comparative structure; and comparing for a fire resistance classification rating (FRCR). Certification can be effected by providing a security code specific for one-time use in relation to a building structure by a user; entering an FRCR of a building structure rated for fire resistance at a first location and the security code to a communication medium; transmitting by the medium the entered rating and the security code from the first location to a second location; and checking the security code of the user to insure it is authorized and specific to that user; if so, recording the rating supplied by the user; if not, notifying an appropriate monitor.

16 Claims, 2 Drawing Sheets

U.S. PATENT DOCUMENTS

| | | | | |
|---|---|---|---|---|
| 4,210,452 A | | 7/1980 | Nicholson et al. | 106/18.18 |
| 4,216,261 A | | 8/1980 | Dias | 442/84 |
| 4,221,837 A | | 9/1980 | Nicholson et al. | 428/288 |
| 4,226,907 A | * | 10/1980 | Sienkowski et al. | 442/142 |
| 4,241,145 A | | 12/1980 | Shukla | 428/537 |
| 4,265,791 A | | 5/1981 | Nicholson et al. | 252/8.1 |
| 4,339,357 A | | 7/1982 | Nicholson et al. | 252/606 |
| 4,345,002 A | | 8/1982 | Smith et al. | 428/288 |
| 4,365,025 A | | 12/1982 | Murch et al. | 521/159 |
| 4,447,336 A | | 5/1984 | Vandersall | 252/7 |
| 4,447,337 A | | 5/1984 | Adl et al. | 252/7 |
| 4,588,510 A | | 5/1986 | Salyer et al. | 252/5 |
| 4,595,414 A | | 6/1986 | Shutt | 106/18.16 |
| 4,606,831 A | | 8/1986 | Kegeler et al. | 252/7 |
| 4,632,813 A | | 12/1986 | Anastasi et al. | 423/310 |
| 4,668,710 A | | 5/1987 | Pawloski et al. | 521/171 |
| 4,686,241 A | | 8/1987 | Pawloski et al. | 521/107 |
| 4,744,965 A | | 5/1988 | Fairchild | 423/310 |
| 4,816,186 A | | 3/1989 | Acitelli | 252/610 |
| 4,822,524 A | | 4/1989 | Strickland | 252/603 |
| 4,839,065 A | | 6/1989 | Vandersall | 252/603 |
| 4,849,298 A | * | 7/1989 | Raevsky | 428/522 |
| 4,983,326 A | | 1/1991 | Vandersall | 252/603 |
| 5,064,710 A | | 11/1991 | Gosz | 428/182 |
| 5,165,904 A | | 11/1992 | Staffel et al. | 423/305 |
| 5,246,652 A | | 9/1993 | Hsu et al. | 264/109 |
| 5,399,375 A | | 3/1995 | Rood | 427/203 |
| 5,401,793 A | * | 3/1995 | Kobayashi et al. | 524/401 |
| 5,443,894 A | * | 8/1995 | Pollock et al. | 428/213 |
| 5,462,699 A | | 10/1995 | Montgomery | 252/609 |
| 5,601,888 A | * | 2/1997 | Fowler | 428/34 |
| 5,603,990 A | | 2/1997 | McGinniss et al. | 427/393.3 |
| 5,626,787 A | | 5/1997 | Porter | 252/4 |
| 5,645,926 A | | 7/1997 | Horrocks et al. | 442/234 |
| 5,672,390 A | * | 9/1997 | Crews et al. | 427/307 |
| 5,702,768 A | | 12/1997 | Orr | 427/236 |
| 5,730,907 A | | 3/1998 | Schultz et al. | 252/400.62 |
| 5,882,541 A | | 3/1999 | Achtmann | 252/8.05 |
| 5,882,550 A | | 3/1999 | Regan | 252/609 |
| 5,912,003 A | | 6/1999 | Chang | 424/405 |
| 5,925,457 A | | 7/1999 | McGinniss et al. | 428/341 |
| 5,931,994 A | | 8/1999 | Herrero | 106/15.05 |
| 5,968,669 A | | 10/1999 | Liu et al. | 428/537.1 |
| 5,989,706 A | | 11/1999 | McGinniss et al. | 428/341 |
| 5,997,758 A | | 12/1999 | Barbarin et al. | 252/3 |
| 6,001,285 A | | 12/1999 | Wunram | 252/606 |
| 6,025,027 A | | 2/2000 | Shutt | 427/337 |
| 6,084,008 A | | 7/2000 | Liu | 523/179 |
| 6,130,267 A | | 10/2000 | Dueber et al. | 521/128 |
| 6,162,375 A | | 12/2000 | Crouch et al. | 252/603 |
| 6,207,085 B1 | | 3/2001 | Ackerman | 252/606 |
| 6,881,248 B2 | | 4/2005 | Lee et al. | 106/18.32 |
| 6,982,049 B1 | | 1/2006 | Mabey et al. | 252/606 |
| 6,989,113 B1 | | 1/2006 | Mabey | 252/606 |
| 7,068,161 B2 | | 6/2006 | Germaine et al. | 340/506 |
| 7,482,395 B2 | | 1/2009 | Mabey et al. | |
| 2003/0089071 A1 | | 5/2003 | Wageneder | 52/741.3 |
| 2003/0097814 A1 | | 5/2003 | Furukawa | 52/750 |
| 2005/0011255 A1 | | 1/2005 | Weisenberger et al. | 73/73 |
| 2005/0022466 A1 | | 2/2005 | Kish et al. | 52/741.3 |
| 2006/0167131 A1 | | 7/2006 | Mabey et al. | 523/122 |
| 2006/0189232 A1 | | 8/2006 | Kish et al. | 442/59 |

OTHER PUBLICATIONS

Mabey, U.S. Appl. No. 60/287,149, filed Apr. 30, 2001 A.D.
Mabey, U.S. Appl. No. 60/526,456, filed Dec. 3, 2003 A.D.
Kish et al., U.S. Appl. No. 10/957,775, filed Oct. 4, 2004 A.D.
Mabey et al., U.S. Appl. No. 60/646,245, filed Jan. 24, 2005 A.D.
Mabey et al., U.S. Appl. No. 11/002,730, filed Dec. 2, 2004 A.D.
Farrell et al., *Environmental Toxicology and Chemistry*, abstract for vol. 17, No. 8, pp. 1552-1557, 1998.
Kia Inc., Kemco International Associates Biocides (www.kemcointernational.com/Biocides.htm) downloaded Dec. 16, 2004.
The Cary Company, web site Home Page, Products and Flame Retardants & Smoke Suppressant Additives web site pages (www.thecarycompany.com/Home.html) (www.thecarycompany.com/products1.html) (www.thecarycompany.com/products/Kemgard.html) downloaded Dec. 16, 2004.
Verichem Inc., web site information and product line pages (www.verichem.org/pages/5/page5.html?refresh=1079996004846) (www.verichem.org/pages/3/page3.html?refresh=1079996005142) (www.verichem.org/pages/2/page2.html?refresh=1079996005008) downloaded Dec. 21, 2004.
Kish, U.S. Appl. No. 60/670,131, filed Apr. 11, 2005 A.D.
Kish et al., U.S. Appl. No. 60/656,148, filed Feb. 23, 2005 A.D.
Environmental Working Group, Chemical Industry Archives, "3M and Scotchgard: 'Heroes of Chemistry' or a year coverup?" p. 1 (www.chemicalindustryarchives.org/dirty_secrets/scotchgard/1.asp) downloaded Jan. 31, 2006.
Kish, Wm., U.S. Appl. No. 11/654,431, filed Jan. 17, 2007.
Kish, Wm., U.S. Appl. No. 11/654,467, filed Jan. 17, 2007.
Mabey et al., U.S. Appl. No. 11/654,486, filed Jan. 17, 2007.
Mabey et al., U.S. Appl. No. 11/654,487, filed Jan. 17, 2007.
Mason Chemical Co., "Maquat 2.5-M," May 1, 2002.
Mason Chemical Co., MSDS Mason CS428, Jan. 2003 A.D.
Mohawk Finishing Products, Mohawk Finishing Search Results, fabric guard and Mohawk Site (search.atomz.com/search/...); Mohawk-Finishing.com, home; Fabric Guard (Reg. U.S. Pat. & Tm. Off.) Product Data Sheet; Fabric Guard Material Safety Data Sheet; Fabricsafe Aerosol Material Safety Data Sheet (www.mohawk-finishing.com/...) downloaded Feb. 4, 2004.
3M Home Care Division, Scotchgard (TM) fabric protector, trade dress, aerosol can, 2002 A.D.
3M Worldwide, scotchguard from 3m.com, Patsy Sherman and the discovery of Scotchgard (TM) Fabric Protector (www.3m.com/about3M/pioneers/sherman.jhtml) downloaded Jan. 31, 2006.
3M Worldwide, Scotchgard (TM) Protector, home; Scotchgard (TM) Protector Carpet Care; Scotchgard (TM) Furniture Care—Do-It-Yourself Products—Fabric Protector; Scotchgard (TM) Protector Outdoor Care (www.3m.com/us/home_liesure/scotchgard/...) downloaded Jan. 30, 2006.
Arch Chemicals, Arch Wood Treated Right, home page with screen print and Dricon FRT Wood: Product Properties (www.archchemicals.com) downloaded Jun. 19, 2008.
Biewer Lumber, Dricon indoor wood, home page and MSDS, plus Product Data 1998 Hickson Corporation (www.biewerlumber.com) downloaded Jun. 19, 2008.
Bluwood, U.S. Tm. Reg. No. 3,269,118 (Jul. 24, 2007), Latest Status Info by TARR system (tarr.uspto.gov) downloaded Jul. 29, 2008.
Daines, "BluWood stands out on Headlands," The Orange County Register, Local, pp. 8+, Jul. 16, 2008.
IDollarStore, "What is MDF, Medium-density fiberboard," p. 1 of 2 (www.idollarstore.com/what_is_mdf.htm) downloaded May 29, 2008.
U.S. Tm. Reg. No. 3,056,604 (Jan. 31, 2006).
International Fireproof Technology, Inc., PTP DC-333 fire retardant latex paint with black mold inhibitor, web site materials (www.painttoprotect.com/...) downloaded Oct. 31, 2006.
Frelo Technology, LLC, HomeGuard fire retardant with mold inhibitor, web site materials (www.frelo.com/...) downloaded Nov. 7, 2006.

* cited by examiner

FIRE RESISTIVE CLASS RATING REGISTRATION FORM

NO. _______

DEALER INFORMATION _______

CLIENT INFORMATION _______

STRUCTURE INFORMATION _______

FIRE RESISTIVE CLASS RATING
FRCR-1☐ FRCR-2☐ FRCR-3☐ FRCR-4☐ FRCR-5☐
OTHER(SPECIFY) _______

PRODUCT(S) USED
(WG)☐ (WG+)☐ (NR+)☐ (NO)☐
PRODUCT LOT# _______

COMMENTS: _______

CERTIFICATION
AUTHORIZED DEALER _______ DATE _______
CLIENT/OWNER _______ DATE _______
HOLOGRAM ALPHANUMERIC CODE NUMBER _______

THE HOLOGRAM ALPHANUMERIC CODE NUMBER AND THE FRCR CERTIFICATION NUMBER MUST MATCH

CERTIFIED No.___ CERTIFIED

CERTIFIED No.___ CERTIFIED

NO. _______
FIRE RESISTIVE CLASS RATING CERTIFICATION

PROTECTED STRUCTURE
NAME/OWNER _______
ADDRESS _______

COUNTY TAX ID# _______

FIRE RESISTIVE CLASS RATING
FRCR☐ FRCR-2☐ FRCR-3☐ FRCR-4☐ FRCR-5☐
DATE OF APPLICATION __/__/__
AUTHORIZED DEALER _______
DATE __/__/__ DEALER NUMBER _______

FIRE RESISTANCE RATING SYSTEM

CROSS-REFERENCE CLAIMS

This claims benefits under 35 USC 119(e) of U.S. provisional patent application No. 60/646,245 by Michael John Mabey and William Kish, filed on Jan. 24, 2005 A.D., entitled, "Intumescent Fire Retardant Latex Paint with Mold Inhibitor." This also claims benefits under 35 USC 120 as a continuation-in-part of U.S. regular utility patent application Ser. No. 10/957,775 by William Kish and Kenneth Rusk, filed on Oct. 4, 2004 A.D., entitled, "Fire Resistance Rating System," now abandoned.

Those specifications are incorporated herein by reference.

BACKGROUND TO THE INVENTION

I. Field

This concerns a method for rating the fire resistance of a building structure, further certification of the rating, and the rated structure. Involved is application to the structure or its component(s) of fire control agent(s).

II. Art

The fire protection industry has seen many changes over the recent centuries. From the bucket brigades of long ago to modern fire departments, from sprinkler systems to stringent fire codes, the fire protection industry is constantly evolving.

Fire retardants have been around for many, many decades. Their use has spanned just about every major industry. The commercial market has driven fire retardant technology over the last half century or so, but more and more attention is being placed on use of fire retardants in the residential setting. Each year more and more people die from fires in the home, often from employment of modern, petroleum-based materials for the construction and furnishing of the home. While old standard type fire retardants could be used freely in the commercial sector, the residential sector presents a much different problem.

Because commercial and residential structures are commonly constructed, furnished, and occupied differently, the old standard type fire retardants used in the commercial setting were not good for the home. The contents of such fire retardants were toxic, and decomposed wood; hence, they were not safe for adults, children, or pets. If a fire started, the very chemicals that kept the fire from spreading also yielded gases that were just as dangerous, if not more so, than the smoke the fire was producing.

About the mid-1990s, newer fire retardants were developed that effectively inhibited the start, growth, and spread of fire. In general, among other things, these newer fire retardants were non-toxic, non-carcinogenic, and environmentally friendly. Through further development, these newer fire retardants were also improved to form a protective barrier when they came in contact with heat or flame, and, in addition, when heated or exposed to flame, they did not produce harmful or toxic gases. Instead, they helped to suppress the production of other toxic fumes and smoke. Among the most effective of these improved fire retardants are those available from NO-BURN, Inc., Wadsworth, Ohio.

Such improved fire retardants can be employed in residences.

Fire, in general, is very complex. Certain things about it, however, are known. Fire behavior is the science of fire and the factors that affect its ignition, growth and spread. Combustion (burning) is the self-sustaining process of rapid oxidation of a fuel being reduced by an oxidizing agent along with the evolution of heat and light. Oxidation is the complex chemical reaction of materials, commonly organic in nature, with oxygen or other oxidizing agents, which forms more stable compounds. Rusting is an example of very slow oxidation, and an explosion is an example of very fast oxidation. Between the two extremes, a free-burning stage of fire is what is most commonly encountered. Fire is generally classified as rapid oxidation, and it burns in two modes: flaming and surface combustion. The flaming mode of combustion can be represented by a fire tetrahedron, with each of the four sides separately representing oxygen, heat, fuel, and an uninhibited chemical chain reaction. The surface or smoldering mode of combustion is represented by a fire triangle, with sides representing oxygen, heat, and fuel. Understanding the fire tetrahedron is important. To stop a flaming fire, one or more sides (components) of the fire tetrahedron must be removed. Many currently available products work to remove the fuel source and to prevent the chemical chain reaction from occurring, forming a protective layer. While protected objects typically are damaged by heat through pyrolysis, they will not sustain the combustion process. Such products are considered to be proactive fire protection measures.

When a fire, however, starts and burns, it continually undergoes changes in size, growth, speed and temperature. These changes are known as fire phases, of which three are commonly recognized: the incipient phase; the free-burning phase; and the smoldering phase. In the incipient phase, at which many daytime fires in buildings are found, the room air has plenty of oxygen, and the fire is producing water vapor, carbon dioxide, and small amounts of sulfur dioxide, carbon dioxide, and other gases. While the temperature of the flame itself may be above a thousand degrees F., the overall temperature in the room may have only risen a few degrees. Most all fires in residences start through the incipient phase. If a fire starts at night when people are asleep or an incipient phase fire goes unchecked for just a few minutes, the fire rapidly grows to the free-burning phase. During this phase, oxygen-rich air is drawn into the flame, and heat is carried to the uppermost parts of the room with the rise of fire gases. As the hotter air spreads out across the ceiling, any combustible materials in the upper level of the room such as pictures, curtains, valances and blinds ignite. These can fall to the floor, further spreading the fire. The air temperature in the room in the upper regions of the room can be exceedingly high in this part of the free-burning phase, often exceeding thirteen hundred degrees F. As fire of this phase continues to consume combustible materials lower and lower in the room, the fire can erupt in a flashover. Flashover is where all the combustible materials in a room ignite simultaneously from the intense radiating heat from the upper walls of the room. This explosion of flames pushes the fire well into other portions of the structure. For example, the fire may be now found inside the walls of the structure, and may find its way up into the attic, across which it can spread, and spread into the volumes between other walls, say, along wooden two-by-four studs, and so forth. If no fresh air is available, the oxygen content decreases until it falls below a level that would support flaming combustion, and the fire then enters the smoldering phase. During this phase, no flame is visible. The fuel and heat, however, are still at levels at which, if oxygen is reintroduced, the fire will re-ignite, sometimes forcefully in what is known as a backdraft.

Not all fires are the same. The classification of a fire is based on what is actually burning. Class A fires are those fires in which ordinary combustible materials such as wood, cloth, paper, rubber and plastics are burning. Many house fires are caused when ordinary combustible materials catch fire. Removing any component of the combustion tetrahedron or triangle will stop a Class A fire. Class B fires are those fires in which flammable liquids are burning. Examples would be greases, gasoline and other fuels or other flammable liquids. Class C fires are those fires in which energized electrical equipment is involved. If possible, the electrical source should be safely disconnected, and the fire treated as a Class A or Class B fire. Class D fires are those in which a combustible metal such as magnesium, sodium or titanium is on fire. Typically, special agents must be used to extinguish Class D fires.

It would be desirable to improve upon the known art. A notable desire would be to improve the art in a comprehensive manner. It would be most desirable to improve the art that concerns fire protection about building structures, especially residences.

FULL DISCLOSURE OF THE INVENTION

In general, the present invention provides, in one aspect, a method for rating fire resistance of a building structure comprising carrying out the following steps:

providing or having made available a building structure;

providing or having made available at least one fire control agent;

applying or noting application or presence of the at least one fire control agent to or with at least one component part of the building structure;

providing a rating format for fire resistance of a comparative building structure; and comparing the applying, application or presence of or with the at least one component part of the building structure to the rating format to provide a fire resistance classification rating.

Further, certification, in general, can be effected as follows:

providing a user a security code specific for one-time use in relation to a building structure by that user;

entering a fire resistance classification rating of a building structure rated for fire resistance at a first location and the security code to a medium for communication;

transmitting by the medium for communication the entered rating and the security code from the first location to a second location; and checking the security code of the user to insure that it is authorized and specific to that user, and, if it is so authorized and specific to that user, recording the rating supplied by the user, but, if it is not authorized and specific to that user, notifying an appropriate monitor as to the same.

Further aspects, in general, can include application of fire control agent(s) to component(s) of the building structure to provide a structure for rating, and thence the rated structure.

The invention is useful in fire protection.

Significantly, by the invention, problems in the art are ameliorated if not overcome, and the art is improved in kind. In particular, a comprehensive system is provided that quantifies or certifies fire resistance of a building structure. Moreover, the invention can be employed as a guide or incentive for providing suitable fire protection to a building structure. Residential building structures, to include, for example, single or multiple family dwellings, say, stick-built, modular, or mobile homes, duplexes, or apartments, which contain combustible material, especially combustible solid building materials or furnishings, especially conventional homes, are advantageously addressed.

Numerous further advantages attend the invention.

The drawings form part of the specification hereof. With respect to the drawings, the following is briefly noted.

The invention can be further understood by detail set forth below, which may be read in view of the drawings. Such is to be taken in an illustrative and not necessarily limiting sense.

The method for rating fire resistance of a building structure comprises carrying out a number of steps. Preferably, a Fire Resistive Class Rating (FRCR), which is certified, is provided.

The FRCR comes from a system that has been developed, among other things, to give professionals such as fire marshals and insurance companies the ability to understand to what extent a structure has been treated. This may be for inspection purposes for a commercial business or for a discount on property insurance through an insurance company. Thus, a company can provide fire control agent(s) to one or more dealers. Each dealer carefully follows specific directions for each structure treated, and reports to the company and the building owner or appropriate person(s) the fire retardant treatment(s) that he rendered or observed and preferably certified. The company can verify the certification and record the information for further reference.

Although the invention may be applicable to Class A-D fires, it generally is more applicable to Class A-C fires. Class A and C fires, especially Class A fires, are typically more pertinent.

Figure 1:
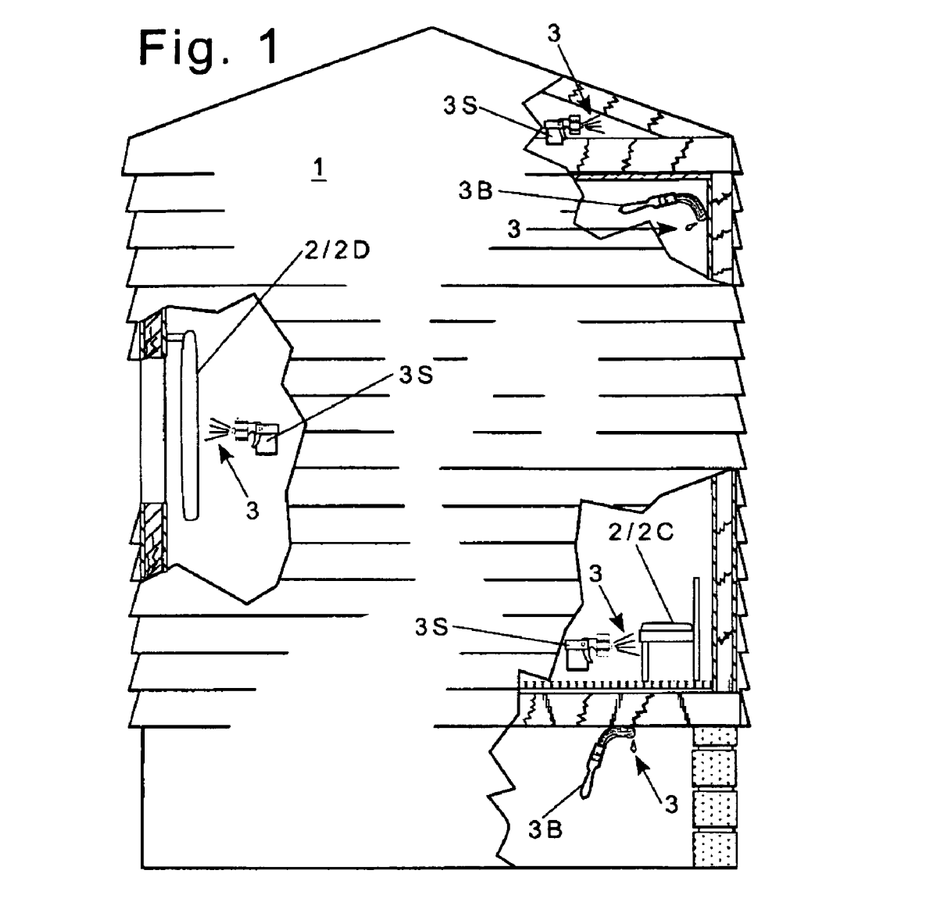
FIG. 1 shows a home for rating its fire resistance.

In the method of the invention for rating fire resistance, a first step is providing or having made available a building structure 1. The structure may be commercial or residential, and may embrace a single unit or multiple units. The building may be ready for construction by being in its component parts, for example, bricks, cement or glass blocks, wooden, wood composite and/or petroleum-based floor joists, ceiling joists, rafters, trusses, subfloors, carpeting or top flooring, outdoor sheathing, interior trim, and so forth; wooden or metal studs; paper-coated gypsum wallboard; petroleum-based, wooden, or metal exterior siding and trim; and so forth. The parts are made into the structure. Alternatively, the building may be existing, i.e., it has been constructed previously. The structure can be furnished with furnishings 2 such as draperies, beds, desks, tables, chairs, sofas, framed pictures, appliances, and so forth and the like. A home is a preferred structure. See, e.g., FIG. 1.

A second step is providing or having made available at least one fire control agent 3. The fire control agent can include a fire retardant substance. The fire retardant substance may be intrinsically fire retardant and be part of the structure, for instance, as represented by generally refractory or nonflammable materials as, for example, those made of concrete, sand, natural rock, gypsum, asbestos, ferrous metals, and so forth and the like such as beneficially found in mortar, bricks, cement or glass blocks, field stone, fire-resistant gypsum wall board or plaster, steel studs, and so forth and the like. The fire retardant substance can be a fire retardant composition that is applied to an otherwise flammable material to render it fire resistant. Beneficially, the fire retardant composition embraces a substance that is an improved fire retardant. For example, among improved fire retardants, an improved fire retardant from NO-BURN, Inc., which removes the fuel source for a fire and prevents the chemical chain reaction of a fire from occurring by forming a protective layer, can be employed. Typically, such an improved fire retardant is a liquid when it is applied, say, by brushing or spraying, and afterwards it dries, leaving its protective residue on the surface of a treated material or in some cases in the body of a treated material such as with porous or absorbent materials, say, open grained wood or textile products. The fire retardant composition is advantageously an alkaline salt type composition, say, one which includes an ammonium phosphate to include as mono/diammonium phosphate(s), for example, ammonium orthophosphate. For instance, the fire retardant composition may include the following ingredients, listed by weight, and which listing may be taken as approximate:

| | |
|---|---|
| Mono/diammonium phosphate | 20~70% |
| Diluent, e.g., solvent, say, water | 25~50% |
| Urea | 2.5~15.0% |
| Glucose | 4.0~12.0% |
| Polysaccharide resin | 2.0~40.0% |
| Nonionic alkylpolyglycoside surfactant, e.g., Glucopon-425 (Henkel Corp.) | 0.2~1.2% |
| Defoaming agent, e.g., potassium salicylate solution | 0.01~0.1%. |

Accordingly, the fire retardant composition can embrace a mixture of an ammonium phosphate salt, which may be substantially neutral, in combination with an active hydrogen-containing nitrogenous organic compound, which generally acts as a spumific, and a hydroxy-containing carbonific. Among benefits of such a composition are that, rather than worrying about putting out a fire, it prevents one from burning. If a fire would start, such a composition, especially as from NO-BURN, Inc., automatically reacts to the fire by combining with the combustible gases and tars, converting them to carbon char, nitrogen and carbon dioxide. Its characteristics also help improve the environment about a structure on fire by eliminating the production of up to some 90% of the smoke and toxic gases produced by a regular fire, which is important because the majority of fire deaths are caused by inhalation of toxic smoke and fumes long before the fire ever gets close to the victims. Additional ingredient(s) may be present. For example, a mold inhibitor may also be present with a fire retardant composition. For instance, the mold inhibitor may be a quaternary ammonium halide, to include a quaternary alkyl ammonium halide, especially such a halide having at least one short chain and at least one medium chain alkyl group, for example, two of each. The short chain alkyl group may be inclusive of a methyl, ethyl, propyl, and so forth group. The medium chain alkyl group may be inclusive of, separately at each occurrence, a six- to twenty-carbon group, and so forth. An aromatic group may be present, for instance, in a quaternary aromatic organic ammonium halide mold inhibitor. The halide is advantageously a chloride. Thus, the mold inhibitor may be didecyldimethylammonium chloride. When the mold inhibitor of a quaternary ammonium salt, say, didecyldimethylammonium chloride, is employed, for instance, about from 0.1 to 10% by weight, to include about from 0.5 to 5% by weight, in a formulation such as listed above, the nonionic alkylpolyglycoside surfactant and the defoaming agent are commonly not employed in the formulation. See, specifications of U.S. patent application Ser. Nos. 10/132,958 and 60/526,456, both incorporated herein by reference. The fire control agent may embrace an intumescent fire reactant. Note, U.S. Pat. Nos. 5,989,706; 5,925,457; 5,645,926; 5,603,990; 5,064,710; 4,365,025; 4,345,002; 4,339,357; 4,265,791; 4,241,145; 4,226,907; 4,221,837; 4,210,452; 4,205,022; 4,201,677; 4,201,593; 4,137,849; 4,028,333; 3,955,987 and 3,934,066. The intumescent fire reactant may be associated with latex. Compare, the latter two patents. The chemical composition of such a reactant changes drastically when introduced to heat, which typically results in foaming up to create an intact, fire-resistive "char-barrier," which protects the surface that has been treated. Among such fire control agents, benefit is gained by using them in the following forms:

Form #1: A brush or spray-on liquid of moderate viscosity and strength. Examples of this are NO-BURN (Reg. U.S. Pat. & Tm. Off.) Wood Gard liquid and NO-BURN Wood Gard MIH liquid with mold inhibitor, both proprietary aqueous compositions available from NO-BURN, Inc. Formulations of such a product can vary but can include, in general, such ingredients as follows:

| | |
|---|---|
| Ammonium orthophosphate (40% aqueous solution) | 50~70% by weight |
| Lorama LPR76 polysaccharide resin (45% aqueous solution) | 20~30% by weight |
| Granulated cane sugar | 5~10% by weight |
| Urea | 5~7% by weight |
| Alkyldimethylbenzyl ammonium chloride (80% aqueous solution) | 0 or 0.5~5% by wt. |

The inhibition of mold can be provided by the addition or increase in use of the mold inhibitor, for example, the alkyldimethylbenzyl ammonium chloride, or another such as didecyldimethyl ammonium chloride, in general, species of a quaternary organic ammonium halide, which also may function, in general, as a surfactant/defoamer. Such a mold inhibitor can be present at about 3% by weight. An increase in concentration of the quaternary ammonium halide mold inhibitor can provide for a corresponding reduction in the amount of the ammonium orthophosphate. With wood being the primary resource of most of the homes built in the U.S.A. and Canada, applying a Form #1 fire retardant, say, Wood Gard liquid, during manufacturing or building of a home can protect internal wood components of a structure. Not only can this prevent further fire spread on and in the structure itself, but also it can reduce damage to the structure and lessen the likelihood of structural collapse, a brutal reality that kills more civilians and firefighters every year. By treating all the wood components, including wall studs, flooring, rafters, trusses, joists, exterior sheathing, roofing and decking, the entire "skeleton" of a structure such as a new home can be better protected from fire. In existing homes, such a fire retardant as Wood Gard liquid can still be employed in a multitude of areas. Special attention must be given the attic area, especially when treating an existing home. If a fire starts in a wall and remains unchecked, that fire can quickly enter the attic and "run" the length of the home in a few minutes. Also, most home fires started from lightning occur in the attic. Exposed floor joists of homes or other structures that have basements and crawl spaces should be treated. Since Wood Gard liquid is water soluble, its employment should be restricted from where moisture levels are high. New homes should not be treated with such a water soluble product until the house is "dried-in" from the weather.

Form #2: A brush or spray-on liquid in a form of a latex primer or finish paint, which is an intumescent fire reactant. An example is NO-BURN Plus latex primer/paint, a proprietary product commercially available from NO-BURN, Inc., which may be beneficially formulated with mold inhibitor. Although such a product looks like and is applied like regular paint, as an intumescent fire reactant, its chemical composition changes drastically when introduced to heat. Thus, when heat is applied, Form #2 products "foam" up to form an intact, fire-resistive "char-barrier" to protect the surface treated by it. Formulations of such a product can vary but can include, in general, such ingredients as follows:

| | | |
|---|---|---|
| Ammonium phosphate solid | 15~20% | by weight |
| Thermoplastic latex resin, e.g., polyvinyl acetate, e.g., StanChem 5238 vinyl acetate copolymer emulsion | 10~30% | by weight |
| Powder melamine | 7~13% | by weight |
| Pentaerythritol | 7~13% | by weight |
| Titanium dioxide | 5~10% | by weight |
| Soda lime borosilicate glass | 1~5% | by weight |
| Texanol | 0.5~1.5% | by weight |
| Hydroxyethyl cellulose | 0.1~1.0% | by weight |
| Defoamer/wetting agent(s) | 0.1~1.0% | by weight. |

Additional ingredient(s) may be present. For example, a coloring/tinting agent and/or mold inhibitor may also be present. For instance, the mold inhibitor may be of the quaternary ammonium halide type, as noted above, for instance, at about from 0.1 to 10%, to include about from 0.5 to 5%, by weight. For example, the mold inhibitor can be the alkyldimethylbenzyl ammonium chloride, or another such as didecyldimethyl ammonium chloride, in general, species of quaternary organic ammonium halide, which can be present, say, at about 3% by weight. A piece of ⅛-inch cardboard, for example, painted with two coats of the NO-BURN Plus and exposed to a blowtorch will remain intact. The intense flame will not penetrate the cardboard. Thus, importantly such a reactant can help to "compartmentalize" a fire and keep it in check until appropriate fire suppression measures can be taken. It has sundry applications. It, too, however, is not recommended for exterior uses as exposure to moisture and UV light can break down its protective qualities and so should be used with caution in such applications.

Form #3: A spray-on liquid of light viscosity and strength. An example of this is NO-BURN Fabric Fire Gard liquid, an aqueous proprietary product commercially available from NO-BURN, Inc. Formulations of such a product can vary but can include, in general, such ingredients as follows:

| | | |
|---|---|---|
| Water | 70~90% | by weight |
| Polyphosphoric acid (115%) | 5~15% | by weight |
| Ammonium hydroxide (29% aqueous solution) | 5~15% | by weight |
| Coco amidopropyl betaine (30% aqueous solution) | 0.05~0.2% | by weight |
| Preservative | 0.01~0.1% | by weight. |

Nothing causes a more hazardous environment or more fire damage than interior furnishings. Because most interior furnishings in the U.S.A. and Canada are now made from synthetic materials, interior fires are burning hotter, faster, and more furiously, within seconds of ignition, which in many cases makes escape nearly impossible. Such synthetic materials give off tremendous amounts of toxic smoke that can incapacitate a person within seconds. As well, interior furnishings make it possible for a fire to "leap" from one end of a home to another within the first few minutes of a fire. Modern sofas, easy chairs, decorations, curtains, carpets and mattresses become extremely volatile, explosive fuels in a fire. This contributes to the most dangerous phase in a fire, "flashover." Treatment with a Form #3 product, again for example, NO-BURN Fabric Gard liquid spray, which is in general colorless and odorless, on home furnishings can prevent them from contributing to a fire, dramatically reducing the speed of flame spread and levels of toxic, choking smoke that would otherwise be generated. For example, an untreated cloth curtain will quickly catch fire with the application of a flame to it, whereas the same type of cloth curtain, which has been treated by spraying with the NO-BURN Fabric Gard simply chars and turns black when the flame is applied to it, and does not catch fire.

Form #4: A brush or spray on liquid with a viscosity and strength intermediate between Forms #1 & #3. An example of this is NO-BURN Original liquid, an aqueous proprietary composition commercially available from NO-BURN, Inc. Formulations of such a product can vary but can include, in general, such ingredients as follows:

| | | |
|---|---|---|
| Water | 55~65% | by weight |
| Ammonium orthophosphate | 35~45% | by weight |
| Glucopon-425 | 0.2~1% | by weight |
| Fragrance | 0.01~0.1% | by weight |
| Preservative | 0.01~0.1% | by weight. |

Form #4 products may be thought of as auxiliary products. A Form #4 product, again, for example, NO-BURN Original liquid, can have many specialty applications. It can be applied, for example, to wooden furniture or wooden parts such as legs and arms of certain partially upholstered furniture, and sanded prior to finishing. The Form #4 product is also excellent for use in crafts.

In the fire control agent, including in various Form #1-4 agents, especially in those that are colorless such as the noted Form #1, #3 and #4 agents of NO-BURN, Inc., a dye may be employed to mark where the agent has been applied. For example, NO-BURN Dye Concentrate provides for a light pink color in the final agent.

A third step is applying or noting application or presence of the at least one fire control agent to or with at least one component part of the building structure. Application of an applied fire control agent such as with the Form #1-#4 agents is typically to any suitable level, or as otherwise indicated herein or known or practiced in the art. Application to otherwise flammable materials rendered flame retardant through application of the applied fire control agent can be off or on site. For example, such rendering may be carried out at a factory, say, by treating individual components of the structure such as wooden two-by-four studs or four-by-eight sheathing with the fire control agent, or away from or at the job site itself by individual craftsmen. Beneficially, however, the building structure that has been erected, or select component(s) of it, can have the fire control agent(s) applied on the construction site. In certain cases where fire retardant building materials have been employed or components have been made fire retardant, it is noted that an applied fire control agent has been applied previously, or an intrinsic fire control agent is present.

A fourth step is providing a rating format for fire resistance of a comparative building structure. For example, with respect to the FRCR, each FRCR denotes how much and/or what component part(s) of a structure has or have been treated, from the entire structure to a part of it. For instance, a home under construction can be completely treated with fire control agent, or otherwise be made to include fire retardant substances, but an existing home, as a general rule, can only be partially treated. These two cases fall under separate FRCRs. A description of exemplary FRCRs for unfurnished or furnished buildings follows:

FRCR-1: This rating is given to any structure in which all of the wooden framing, say, of a home, or all of the wooden components in a steel frame structure, say, of a commercial building, are treated with a Form #1 agent, for example, NO-BURN Wood Gard liquid or NO-BURN Wood Gard MIH liquid with mold inhibitor, after the dry-in stage of construction. Coverage of the wooded components constitutes one coat over all accessible areas of the structure, and two coats in areas that create voids upon completion of the construction, for example, ventilation chases, gas fireplace encasements, stairwells, and where multiple rooflines meet. Interior walls are primed with at least one coat of a Form #2 agent, for example, NO-BURN Plus paint, with or without mold inhibitor. High hazard areas such as garages, laundry rooms, electrical rooms, and mechanical rooms are primed or painted with at least two coats of Form #2 agent. The highest fire-resistive rating for an unfurnished building is FRCR-1. This rating is typically given to new construction or totally remodeled structures.

FRCR-2: This rating is given any structure in which all of the wooden framing, or all the wooden components in a steel frame structure such as often in commercial construction, are treated with a Form #1 agent after the dry-in stage of construction. Coverage of the wooded components constitutes one coat over all accessible areas of the structure, and two coats in areas that create voids upon completion of the construction, for example, ventilation chases, gas fireplace encasements, stairwells, and where multiple rooflines meet. Interior walls are not primed nor painted with a Form #2 agent. This rating is also typically given to new construction or totally remodeled structures.

FRCR-3: This rating is given to any structure in which all of the wooden framing and other wooden components that make up the attic structure above the living space are treated with a Form #1 agent, for example, NO-BURN Wood Gard liquid. Where applicable, crawl spaces and basements are also treated, for example, with NO-BURN Wood Gard MIH liquid with mold inhibitor. Coverage of the wooded components constitutes one coat over all accessible areas of the attic structure. Interior walls are primed with at least one coat of a Form #2 agent, for example, NO-BURN Plus paint. High hazard areas such as garages, laundry rooms, electrical rooms, and mechanical rooms are primed or painted with two coats of Form #2 agent. This rating is typically given to existing structures.

FRCR-4: This rating is given for any structure in which all of the interior finished walls are primed or painted with at least one coat of a Form #2 agent. High hazard areas such as garages, laundry rooms, electrical rooms, and mechanical rooms are primed or painted with two coats of Form #2 agent. No part of the wooden components of the structure is treated with a Form #1 agent. This rating is typically given to existing structures.

FRCR-5: This rating is given to any structure in which all of the wooden components that make up the attic structure above the living space are treated with a Form #1 agent. Where applicable, crawl spaces and basements are also treated. Coverage of the wooded components constitutes one coat over all accessible areas of the attic structure. The interior walls are not primed nor painted with a Form #2 agent. This is the lowest rating for an unfurnished building. This rating is typically given to existing structures.

The FRCR-1 rating level of fire resistance is recommended over FRCR-2 for new construction, and FRCR-3 is recommended over FRCR-4 and FRCR-5 for existing structures. Budgetary and other constraints, however, may dictate treatment of a structure at the lesser rating levels.

For furnished buildings, a PLUS (+) or PLUS-PLUS (++) designation may be added. The PLUS designation is given to a furnished structure in which its draperies, rugs, carpets, mattresses, and the textile portions of other textile containing furnishings are treated with a Form #3 agent, for example, NO-BURN Fabric Gard liquid. One spray coat typically constitutes adequate coverage for the PLUS designation. Thus, for example, an unfurnished structure with a FRCR-1 rating may have its textile furnishings treated as above, and receive the PLUS designation FRCR-1+. The PLUS-PLUS designation is given to a furnished structure that qualifies for the PLUS designation and, in addition, has the wooden components of furnishings such as desks, chairs, bookcases, shelving, picture frames, wooden baskets, knickknacks, and so forth treated with a Form #4 agent, for example, NO-BURN Original liquid. One coat of the Form #4 agent constitutes adequate coverage. Thus, for example, a furnished structure with an FRCR-3+rating may have further treatment as noted immediately above with the Form #4 agent and receive the PLUS-PLUS designation FRCR-3++.

Accordingly, a multi-level rating system can be provided. More coats of the Form #1, #2, #3 and/or #4 agent(s) may be applied than required for a given rating level if desired.

A fifth step is comparing the applying, application or presence of or with the at least one component part of the building structure to the rating format to provide a fire resistance classification rating. Thus, for example, when a building structure complies with the requirements of the FRCR-1 rating, it is thus rated; when a building structure complies with the requirements of the FRCR-2 rating, it is so rated; and so on.

Figure 2:
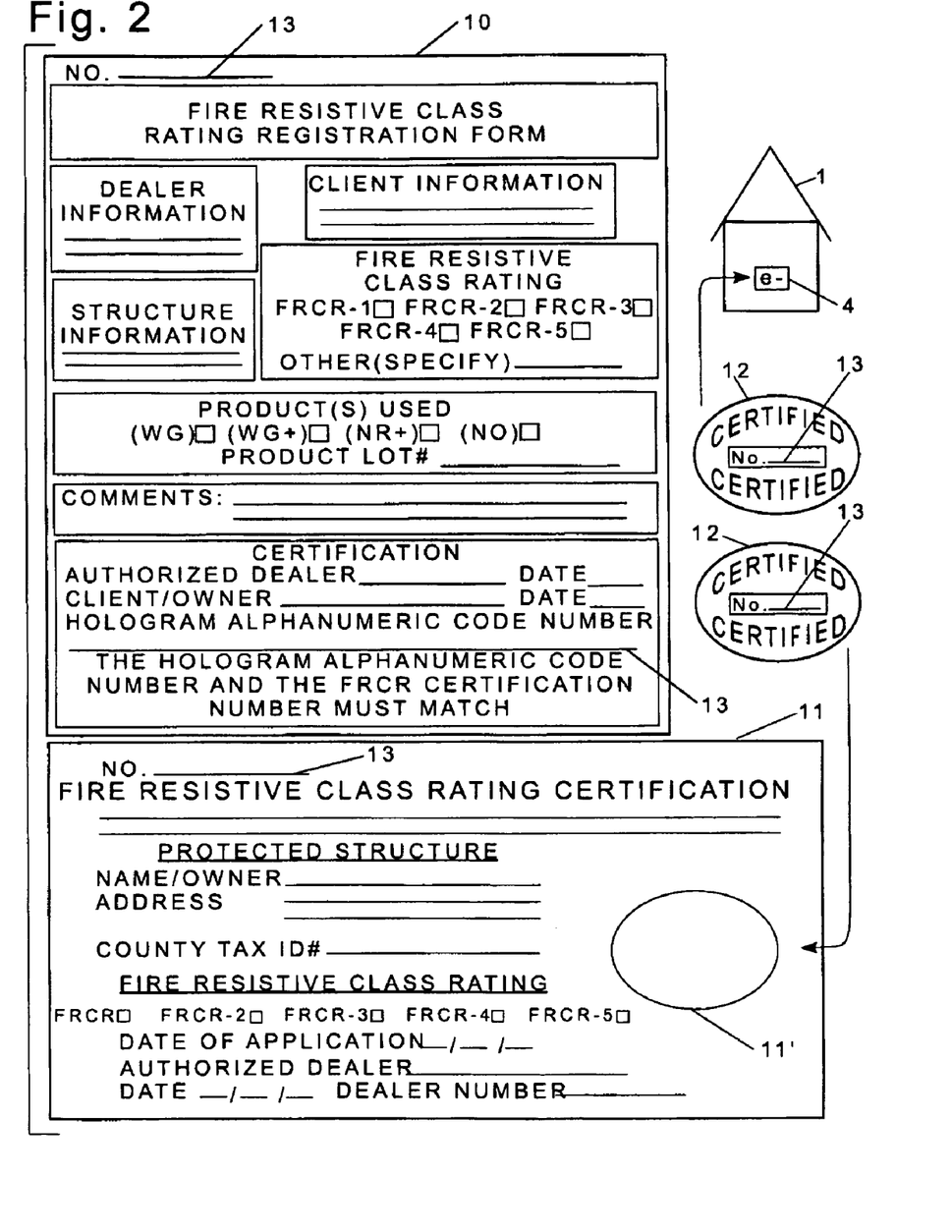
FIG. 2 shows certification forms for the rating.

Certification of a rating can be effected. The certification can be and preferably is included as a security provision for the rating method, and can be carried out by steps further to the rating method, which embrace steps such as those that follow:

A first certification step is providing a user a security code specific for one-time use in relation to a building structure by that user. The user, who is desirably a dealer authorized by the company, is responsible for maintaining the bulk of the security afforded by certification. As an example, provision of the security code can be effected through provision of registration and acknowledgement of certification forms from a company to its dealers, for example, with the dealers purchasing the forms, which are encoded specifically for those dealers. In one embodiment, the forms embrace one set of two forms, one form for registration of the FRCR and other data, the other form for ribbon acknowledgement of certification of the FRCR, with both forms prepared in identical duplicate versions for execution, say, made of paper with a carbon or carbonless copy of a top original. Thus, in this embodiment, there are two different paper forms, each made out in identical duplicate. Each form is marked with the same security code, for example, a number unique for these two sets of forms. A sticker, for example, a hologram sticker that includes the notation, "certified," and includes the same number unique to the forms, can be provided as part of the set with the two forms. The company records which sets of such forms, say, plus stickers, are provided to each dealer, again, each set bearing a number unique to that set. See, FIG. 2.

A second certification step can include entering the fire resistance classification rating of a building structure rated for fire resistance at a first location and the security code to a medium for communication. The fire resistance class rating can be, for example, one of the foregoing FRCR level ratings, which can be obtained as noted previously. The first location can be the site of the building structure or another site, for example, an office or the user. Such a rating can be already present on the forms with the security code. As such, the forms would constitute the medium for communication. Media for communication can also include speech; notes for speaking; instructions to messengers; communication-transmittal technology such as tape, wire, or digital recorders, telegraphs, telephones, televisions, radios, computer keyboards and/or terminals, and so forth; other written form for communication including letters; and so forth and the like. Entry may be made at the building structure site, for example, by posting the rating and security code, say, in the form of the hologram sticker, on the building at a poignant spot, such as on an electrical panel, or inside or outside of the door of an electrical box. This may be an entry in addition or in lieu of any entry on the forms, for example. In certain cases, say, with such rudimentary matters as speech, such as may be conducted about the first site itself, this second and following third certification steps can be construed to merge as one.

A third certification step can include transmitting by the medium for communication the entered rating and the security code from the first location to a second location. Of course, if a user, say, were to communicate on the first location to a company representative about the building site, for example, by ordinary speech or by the passing a note or forms, the second and third certification steps could be construed as merging as one or may be construed as having the user on the first site with the company representative on a second location inches away from the first. Falsification for the rating by a user not a dealer would, of course, subject him to prosecution, and falsification by a user who is a dealer would subject him to loss of his dealership in addition to any prosecution. In general, the transmitting is done through the same medium for communication engaged by the user in the second certification step. The transmitting can be, for example, from the dealer to the company and/or from the dealer to the owner of the building structure or to another entity. Preferably, the transmitting is from the dealer to the company, and from the dealer to the owner of the building structure under consideration, including by transmitting a copy of the registration form to the company and leaving an original acknowledgement of certification form that includes the hologram sticker with the building owner. The hologram sticker is such that if attempts are made to remove or alter it it is easily damaged, it being understood that a damaged hologram sticker is considered presumptive evidence of a faulty or invalid FRCR rating certification. Also, it is desirable that the building owner review and sign a form, for example, the duplicate registration form, preferably the original of which is retained by the dealer and a copy of which is transmitted to the company.

A fourth certification step can include checking, say, at the second location or at any other location, the security code of the user to insure that it is authorized and specific to that user. If it is so authorized and specific to that user, recording the rating supplied by the user, but, if it is not authorized and specific to that user, notifying an appropriate monitor as to the same. The monitor can be a person or a device, for example, a computer, which can, say, generate an alarm or a notice of any deficiency that may be received by a person. For example, the monitor may be a person or device associated with a local fire department, a local police department or city, county or township agency, with an insurance agency or company, and so forth. The user and/or building owner, too, for example, may be notified for positive and/or negative results upon the checking.

Optionally, the dealer or other user may be requested to account for all security-coded materials provided him. This can be done periodically, say, quarterly or annually, and can include accounting for every form and/or sticker whether used in rating or not. This may help prevent abuse of the system, say, in a fraudulent scheme or in lethargic reporting, in which posting on-site of a putative FRCR is carried out, but not reported.

The steps for the rating and for the certification need not necessarily be conducted in the series that are indicated above. Desirably, however, they at least generally follow such formats. Compare, FIG. 1A.

Figure 1A:
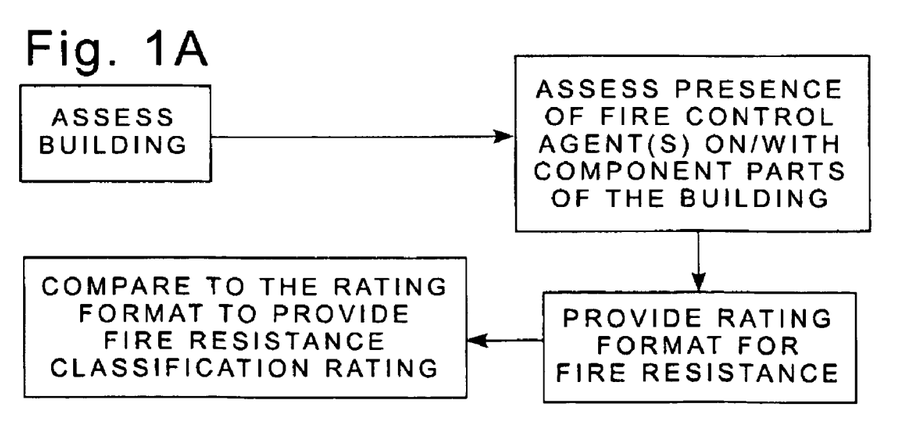
FIG. 1A is a flow chart of a method for rating a structure.

With further reference to the drawings, again, the building structure 1 can have furnishings 2. The fire control agent 3 can be applied by brush 3B and/or spray 3S. The structure 1 can have poignant spot 4 such as an electrical panel or electrical box having a door. Certification forms can embrace the FRCR registration form 10 and ribbon acknowledgment of FRCR certification form 11 having site 11' for placing a first of a pair of matching hologram stickers 12, with a second of the pair of matching hologram stickers 12 placed on the poignant spot 4 such as on the electrical panel or inside or outside the door of the electrical box. The forms 10, 11 and the first and second hologram stickers 12 all include the same security code 13. The registration form 10 also can be provided in duplicate and have a dealer information space to list authorized dealer with contact, address, city, state, ZIP code, and phone number; client information space to list name, contact, address, city, state, ZIP code, and phone number; structure information space to list address, city, state, ZIP code, county, tax I.D. number, and description; FRCR space to indicate the fire resistive class rating that the structure 1 is certified to have; product(s) used space to indicate, for example, use of Wood Gard (WG), Wood Gard MIH Plus (WG+), NO-BURN Plus (NB+) and/or NO-BURN Original product(s) from No-Burn, Incorporated; comments space; and certification space, which can recite: "The above listed structure has been treated with No-Burn by the authorized No-Burn dealer listed. The Client/Owner listed above understands that No-Burn is not a fireproofing agent and is not capable of preventing any type of fire from occurring. No-Burn is a fire retardant/reactant, that when applied correctly, can slow the forward spread of fire throughout the structure. No-Burn is not intended to protect this structure from fires of a criminal or suspicious nature in which an accelerant is used. The client further understands that the FRCR of this structure does not include any type of interior/exterior home furnishing(s). The client fully understands the recommendation from No-Burn and its authorized dealer that all interior home furnishings be treated with No-Burn Fabric Gard. The client understands that any alterations or additions to this structure must also be treated with No-Burn in the same manner in order to maintain this structure's FRCR. PRODUCT, SERVICE and APPLICATION WARRANTY ARE AS FOLLOWS: No-Burn, Inc. (parent company) warrants that the No-Burn formula will be manufactured to the same specifications and Quality, and will perform equally to the test performed by the independent laboratories when properly applied by an authorized No-Burn dealer. No-Burn, Inc. warrants the product only to the cost of product. The authorized No-Burn dealer warrants that the product, in its original form from the manufacturer, will be mixed, stirred and/or applied as directed in the guidelines from No-Burn, Inc. to every reasonably accessible area that is specified to protect. All implied warranties from No-Burn, Inc. or its authorized dealer are excluded. The use of any sub-contractors, such as painters, utilized for the application of any No-Burn product, certify that the product was applied as directed in the guidelines from No-Burn, Inc. This structure has been inspected and meets the above listed fire resistive class rating." In the certification space of the form 10 is space for placing the security code 13, under which can be recited, "The Hologram Alphanumeric Code Number and the FRCR Certificate Number must match." The form 10 can be provided in duplicate copies, say, white and yellow, with its certification space indicating that the white copy is for the dealer with the yellow copy sent to "No-Burn, Inc., 1392 High Street, Suite 211, Wadsworth, Ohio 44281." Finally in the certification space of the form 10 can be listed the phone number. "1-800-989-8577,"and the form number, "NBI-FRCR 7500." The ribbon acknowledgment of FRCR certification form 11 also can state. "No-Burn, Inc., 1392 High Street, Suite 211, Wadsworth, Ohio 44281 1-800-989-8577," and it can recite: "The structure listed below has been treated with No-Burn by the authorized No-Burn dealer listed. The Client/Owner of this property understands that No-Burn is not a fireproofing agent and is not capable of preventing any type of fire from occurring. No-Burn is a fire retardant/reactant, when applied correctly, can slow the forward spread of fire throughout the structure. No-Burn is not intended to protect this structure from fires of a criminal or suspicious nature in which an accelerant is used. The client further understands that the FRCR of this structure does not include any type of interior/exterior home furnishing(s). The client fully understands the recommendation from No-Burn, Inc. and its authorized dealer that all interior home furnishings be treated with No-Burn Fabric Gard for maximum protection from fire. The client understands that any alterations or additions to this structure must also be treated with No-Burn in the same manner in order to maintain this structure's FRCR. PRODUCT, SERVICE and APPLICATION WARRANTY ARE AS FOLLOWS: No-Burn, Inc. (parent company) warrants that the No-Burn formula will be manufactured to the same specifications and quality, and will perform equally to the test performed by the independent laboratories when properly applied by an authorized No-Burn dealer. No-Burn, Inc. warrants the product only to the cost of product. The authorized No-Burn dealer warrants that the product, in its original form from the manufacturer, will be mixed, stirred and/or applied as directed in the guidelines from No-Burn, Inc. to every reasonably accessible area that is specified to protect. All implied warranties from No-Burn, Inc. or its authorized dealer are excluded. The use of any sub-contractors, such as painters, utilized for the application of any No-Burn product, certify that the product was applied as directed in the guidelines from No-Burn, Inc. This structure has been inspected and meets the fire resistive class rating listed below." The site 11' can instruct: "Place FRCR Hologram Sticker here. This certificate is not valid without the FRCR Hologram sticker affixed." Finally, the form 11 can recite its form number, "NBI-FRCR 7400." The hologram stickers 12 also can indicate, "NO-BURN." Compare, FIGS. 1-2.

The present invention is thus provided. Various features, parts, steps, subcombinations and/or combinations can be carried out with or without reference to other features, parts, steps, subcombinations and/or combinations in the practice of the invention, and numerous adaptations and modifications can be effected within its spirit, the literal claim scope of which is particularly pointed out as follows:

What is claimed is:

1. A method to determine a fire resistance rating of a building structure, which comprises carrying out the following steps, but not necessarily in series:

determining whether the building structure has wooden components that make up an attic structure above a living space, and determining whether the building structure has wooden components in a crawl space or basement, which would include floor joists;

determining whether the building structure has, in addition to any wooden components that make up an attic structure above a living space and any such wooden components in any crawl space or basement, further wooden framing or wooden components in a steel frame structure; and determining whether the building structure has interior finished walls to include whether the building structure has interior finished walls not in and in high hazard areas;

determining whether all accessible wooden components that make up an attic structure above a living space are treated after dry-in stage of construction with at least one coat of a Form #1 agent, and whether any such wooden components in any crawl space or basement is also treated after dry-in stage of construction with the Form #1 agent;

determining, further to that for any wooden components that make up an attic structure above a living space and any such wooden components in any crawl space or basement, whether all of the further wooden framing and wooden components in any steel frame structure are treated over all accessible areas with at least one coat of the Form #1 agent after dry-in stage of construction and with at least two coats of the Form #1 agent after the dry-in stage of construction in areas which create voids with completion of construction; and determining whether the interior finished walls not in a high hazard area are primed or painted with at least one coat of a Form #2 agent with the interior finished walls in any high hazard area primed or painted with at least two coats of the Form #2 agent, or the interior walls are not primed nor painted with the Form #2 agent; and assigning a first fire resistance classification rating to the structure when it has been determined that the building structure has, in addition to any wooden components that make up an attic structure above a living space and any wooden components in any crawl space or basement, which would include floor joists, further wooden framing or wooden components in a steel frame structure; that any such wooden components that make up an attic structure above a living space, any such wooden components in any crawl space or basement, and the further wooden framing and wooden components in any steel frame structure are treated over all accessible areas with at least one coat of the Form #1 agent after the dry-in stage of construction, and with at least two coats of the Form #1 agent after the dry-in stage of construction in areas which create voids with completion of construction; and that the building structure has the interior finished walls not in a high hazard area, and that these are primed or painted with at least one coat of the Form #2 agent, and that the building structure with the interior finished walls in any high hazard area has these primed or painted with at least two coats of the Form #2 agent;

assigning a second fire resistance classification rating to the structure when it has been determined that the building structure has, in addition to any wooden components that make up an attic structure above a living space and any wooden components in any crawl space or basement, which would include floor joists, further wooden framing or wooden components in a steel frame structure; that any such wooden components that make up an attic structure above a living space, any such wooden components in any crawl space or basement, and the further wooden framing and wooden components in any steel frame structure are treated over all accessible areas with at least one coat of the Form #1 agent after the dry-in stage of construction, and with at least two coats of the Form #1 agent after the dry-in stage of construction in areas which create voids with completion of construction; and that the building structure has interior finished walls, but that the interior walls are not primed nor painted with the Form #2 agent;

assigning a third fire resistance classification rating to the structure when it has been determined only that the building structure has wooden components which make up an attic structure above a living space and that all accessible wooden components which make up the attic structure above a living space are treated with at least one coat of the Form #1 agent after the dry-in stage of construction, and that any wooden components in any crawl space or basement, which would include floor joists, are also treated with the Form #1 agent after the dry-in stage of construction in all accessible areas; that the building structure has the interior finished walls not in a high hazard area, and that these are primed or painted with at least one coat of the Form #2 agent; and that the building structure with the interior finished walls in any high hazard area has these primed or painted with at least two coats of the Form #2 agent;

assigning a fourth fire resistance classification rating to the structure when it has been determined only that the building structure has the interior finished walls not in a high hazard area, and that these are primed or painted with at least one coat of the Form #2 agent; and that the building structure with the interior finished walls in any high hazard area has these primed or painted with at least two coats of the Form #2 agent; and assigning a fifth fire resistance classification rating to the structure when it has been determined only that the building structure has wooden components which make up an attic structure above a living space and that all accessible wooden components which make up the attic structure above a living space are treated with at least one coat of the Form #1 agent after the dry-in stage of construction, and that any wooden components in any crawl space or basement, which would include floor joists, are also treated with the Form #1 agent after the dry-in stage of construction over all accessible areas;

wherein:
the Form #1 agent is a fire control agent applied as a liquid of moderate viscosity and strength, not in a form of a latex primer or finish paint, which can be brushed and/or sprayed on; and
the Form #2 agent is a fire control agent applied in the form of a latex primer or finish paint, which is an intumescent fire reactant.

2. The method of claim 1, wherein the fire control agent(s) had been applied to the building structure as a new or remodeled structure.

3. The method of claim 1, wherein the fire control agent(s) had been applied to the building structure as an existing structure.

4. The method of claim 1, wherein the fire control agent(s) effectively include(s) an ammonium phosphate.

5. The method of claim 4, wherein the Form #1 agent embraces ingredients, in general, as follows:

| | |
|---|---|
| Ammonium orthophosphate (40% aqueous solution) | about from 50% to 70% by weight |
| Polysaccharide resin (45% aqueous solution) | about from 20% to 30% by weight |
| Cane sugar | about from 5% to 10% by weight |
| Urea | about from 5% to 10% by weight |
| Alkyldimethylbenzyl ammonium chloride (80% aqueous solution) | 0% or about from 0.5% to 5% by weight; | and the Form #2 agent embraces ingredients, in general, as follows:

| | |
|---|---|
| Ammonium phosphate solid | about from 15% to 20% by weight |
| Thermoplastic latex resin | about from 10% to 30% by weight |
| Powder melamine | about from 7% to 13% by weight |
| Pentaerythritol | about from 7% to 13% by weight |
| Titanium dioxide | about from 5% to 10% by weight |
| Soda lime borosilicate glass | about from 1% to 5% by weight |
| Texanol | about from 0.5% to 1.5% by weight |
| Hydroxyethyl cellulose | about from 0.1% to 1.0% by weight |
| Defoamer/wetting agent(s) | about from 0.1% to 1.0% by weight. |

6. The method of claim 1, wherein the building structure is furnished, and which further comprises the following steps, which are not necessarily conducted in series:
determining whether there are draperies, rugs, carpets, mattresses and textile portions of other textile-containing furnishings; and
determining whether there are wooden components of furnishings including in desks, chairs, bookcases, shelving, picture frames, wooden baskets, and knickknacks; and
determining whether such draperies, rugs, carpets, mattresses and textile portions of other textile-containing furnishings have been treated with a Form #3 agent; and
determining whether such wooden components of furnishings including desks, chairs, bookcases, shelving, picture frames, wooden baskets, and knickknacks have been treated with a Form #4 agent; and
assigning a first suffix designation to be added to the first, second, third, fourth or fifth fire resistive classification rating when it has been determined only that such draperies, rugs, carpets, mattresses and textile portions of other textile-containing furnishings have been treated with the Form #3 agent; and
assigning a second suffix designation to be added to the first, second, third, fourth or fifth fire resistive classification rating when it has been determined that such draperies, rugs, carpets, mattresses and textile portions of other textile-containing furnishings have been treated with the Form #3 agent, and that such wooden components of furnishings including desks, chairs, bookcases, shelving, picture frames, wooden baskets, and knickknacks have been treated with the Form #4 agent;
wherein:
the Form #3 agent is a fire control agent, not in the form of a latex primer or finish paint, which is applied as a spray-on liquid of light viscosity and strength; and the Form #4 agent is a fire control agent, not in the form of a latex primer or finish paint, which is applied as a liquid of viscosity and strength intermediate between the Form #1 agent and the Form #3 agent.

7. The method of claim 6, wherein the fire control agent(s) effectively include(s) an ammonium phosphate.

8. The method of claim 7, wherein the Form #1 agent embraces ingredients, in general, as follows:

| | |
|---|---|
| Ammonium orthophosphate (40% aqueous solution) | about from 50% to 70% by weight |
| Polysaccharide resin (45% aqueous solution) | about from 20% to 30% by weight |
| Cane sugar | about from 5% to 10% by weight |
| Urea | about from 5% to 10% by weight |
| Alkyldimethylbenzyl ammonium chloride (80% aqueous solution) | 0% or about from 0.5% to 5% by weight; | the Form #2 agent embraces ingredients, in general, as follows:

| | |
|---|---|
| Ammonium phosphate solid | about from 15% to 20% by weight |
| Thermoplastic latex resin | about from 10% to 30% by weight |
| Powder melamine | about from 7% to 13% by weight |
| Pentaerythritol | about from 7% to 13% by weight |
| Titanium dioxide | about from 5% to 10% by weight |
| Soda lime borosilicate glass | about from 1% to 5% by weight |
| Texanol | about from 0.5% to 1.5% by weight |
| Hydroxyethyl cellulose | about from 0.1% to 1.0% by weight |
| Defoamer/wetting agent(s) | about from 0.1% to 1.0% by weight; | the Form #3 agent embraces ingredients, in general, as follows:

| | |
|---|---|
| Water | about from 70% to 90% by weight |
| Polyphosphoric acid (115%) | about from 5% to 15% by weight |
| Ammonium hydroxide (29% aqueous solution) | about from 5% to 15% by weight |
| Coco amidopropyl betaine (30% aqueous solution) | about from 0.05% to 0.2% by weight |
| Preservative | about from 0.01% to 0.1% by weight; | and the Form #4 agent embraces ingredients, in general, as follows:

| | |
|---|---|
| Water | about from 55% to 65% by weight |
| Ammonium orthophosphate | about from 35% to 45% by weight |
| Glucopon-425 | about from 0.2% to 1% by weight |
| Fragrance | about from 0.01% to 0.1% by weight |
| Preservative | about from 0.01% to 0.1% by weight. |

9. The method of claim 1, which further comprises effecting certification of the fire resistance rating of the building structure by carrying out the following further steps, which are not necessarily conducted in series:
 providing a user a security code specific for one-time use in relation to the building structure by that user;
 entering to a medium for communication at a first location the first, second, third, fourth or fifth fire resistive classification rating assigned to the building structure, and the security code;
 transmitting by the medium for communication from the first location to a second location the entered fire resistive classification rating assigned to the building structure, and the security code; and
 checking the security code of the user to insure that it is authorized and specific to that user, and, if it is authorized and specific to that user, recording the fire resistive classification rating supplied by the user, but, if it is not authorized and specific to that user, notifying an appropriate monitor as to the same.

10. The method of claim 9, wherein the fire control agent(s) had been applied to the building structure as a new or remodeled structure.

11. The method of claim 9, wherein the fire control agent(s) had been applied to the building structure as an existing structure.

12. The method of claim 9, wherein the fire control agent(s) effectively include(s) an ammonium phosphate.

13. The method of claim 12, wherein the Form #1 agent embraces ingredients, in general, as follows:

| | |
|---|---|
| Ammonium orthophosphate (40% aqueous solution) | about from 50% to 70% by weight |
| Polysaccharide resin (45% aqueous solution) | about from 20% to 30% by weight |
| Cane sugar | about from 5% to 10% by weight |
| Urea | about from 5% to 10% by weight |
| Alkyldimethylbenzyl ammonium chloride (80% aqueous solution) | 0% or about from 0.5% to 5% by weight; | and the Form #2 agent embraces ingredients, in general, as follows:

| | |
|---|---|
| Ammonium phosphate solid | about from 15% to 20% by weight |
| Thermoplastic latex resin | about from 10% to 30% by weight |
| Powder melamine | about from 7% to 13% by weight |
| Pentaerythritol | about from 7% to 13% by weight |
| Titanium dioxide | about from 5% to 10% by weight |
| Soda lime borosilicate glass | about from 1% to 5% by weight |
| Texanol | about from 0.5% to 1.5% by weight |
| Hydroxyethyl cellulose | about from 0.1% to 1.0% by weight |
| Defoamer/wetting agent(s) | about from 0.1% to 1.0% by weight. |

14. The method of claim 9, wherein provision of the security code is effected through provision of registration and acknowledgement of certification forms, each of which has the same security code.

15. The method of claim 14, wherein a set of stickers, each of which is easily damaged if attempts are made to remove or alter it, is provided and includes the same security code for each sticker as that of the registration and acknowledgement of certification forms, with a first sticker of the set of stickers being affixed to the acknowledgement of certification form and a second sticker of the set of stickers to a poignant spot on the building structure.

16. The method of claim 15, wherein, as the registration and acknowledgement of certification forms, a set of duplicate registration forms and a set of duplicate acknowledgement of certification forms are provided; and the first and second stickers of the set of stickers are hologram stickers.

* * * * *